United States Patent [19]

Goudy, Jr.

[11] 4,329,067
[45] May 11, 1982

[54] FLUID MIXER

[75] Inventor: Paul R. Goudy, Jr., 8920 W. Hampton Ave., Milwaukee, Wis. 53225

[73] Assignees: Bruce J. Landis; Kenneth J. Landis; Paul R. Goudy, Jr., ; a part interest

[21] Appl. No.: 109,490

[22] Filed: Jan. 4, 1980

Related U.S. Application Data

[63] Continuation-in-part of Ser. No. 897,670, Apr. 19, 1978, Pat. No. 4,259,021.

[51] Int. Cl.³ .......................... B01F 5/06; B01F 15/02
[52] U.S. Cl. .................................. 366/182; 123/25 E; 137/88; 366/337
[58] Field of Search ................ 137/87, 88; 123/25 E, 123/25 R, 25 A; 366/336, 337, 338, 340, 151, 152, 160, 154, 136, 137, 177, 179, 182

[56] References Cited

U.S. PATENT DOCUMENTS

| | | | |
|---|---|---|---|
| 2,802,648 | 8/1957 | Christensen | 366/340 |
| 3,356,101 | 12/1967 | Tacchi | 137/88 |
| 3,856,270 | 12/1974 | Hemker | 366/340 |
| 4,087,862 | 5/1978 | Tsien | 366/304 |

FOREIGN PATENT DOCUMENTS 1532742  6/1968  France ............................ 366/340

Primary Examiner—Robert W. Jenkins
Attorney, Agent, or Firm—Maky, Renner, Otto & Boisselle

[57] ABSTRACT

A fluid mixer includes a porous foam disc for dispersing fluid flowing therethrough, an inlet disc adjacent one surface of the porous disc for limiting the area of the latter through which fluid may enter the same, an outlet disc proximate an opposite side of the porous disc for limiting the area of the latter at which fluid may leave the same, with the radial location of the inlet area being different from that of the outlet area to obtain dispersed fluid flow through the foam disc. Other features include a fluid orifice assembly using an orifice housing held in fluid-tight relation to a fluid fitting by a radially applied force; and a differential pressure responsive mixing control valve for controlling flow of one fluid into a mixing chamber to which another fluid also is delivered.

39 Claims, 11 Drawing Figures

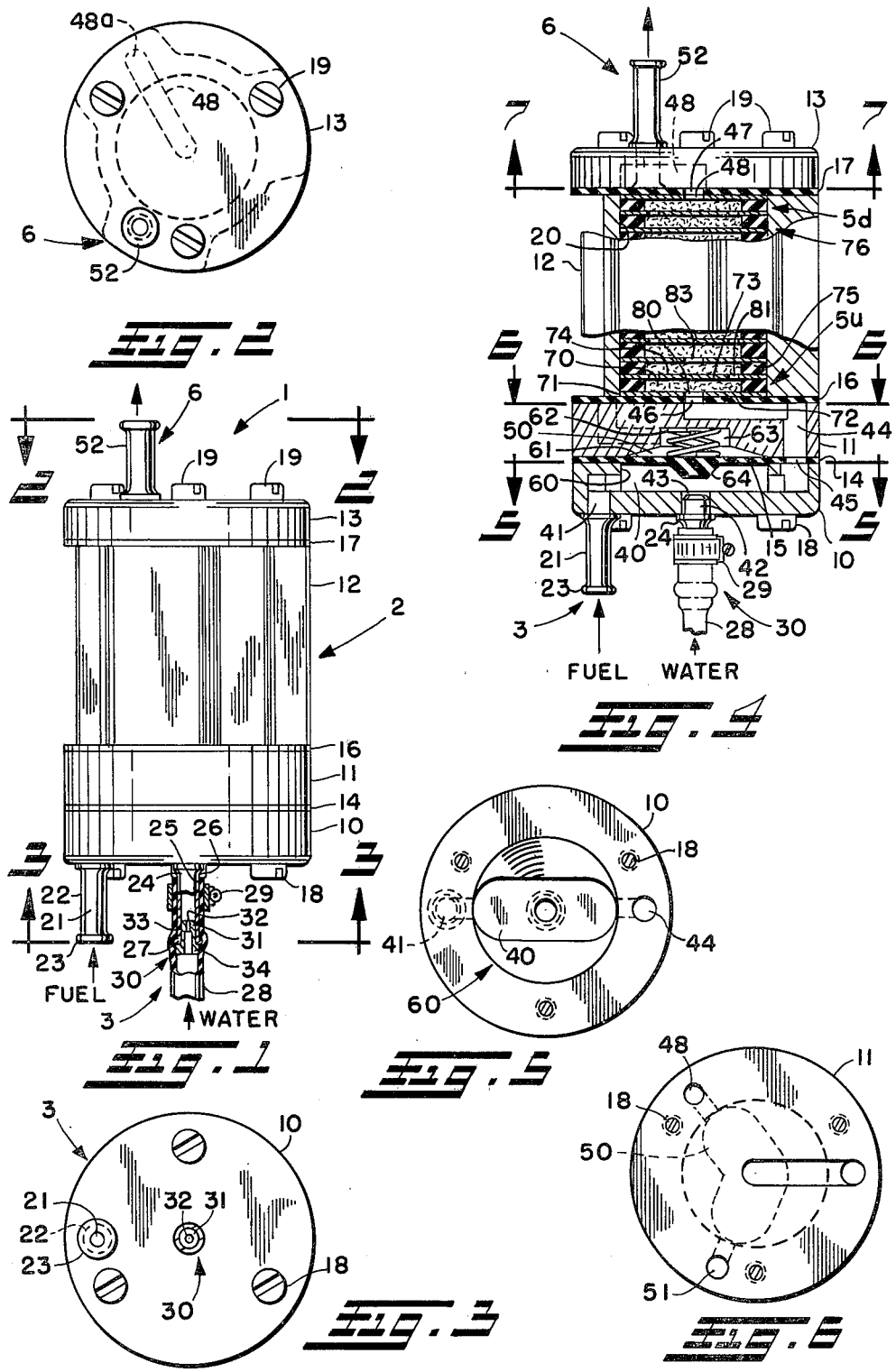

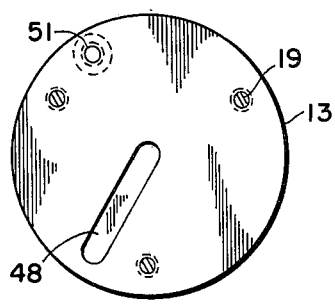
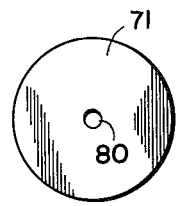
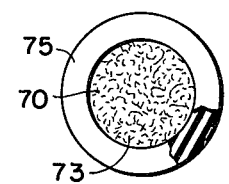
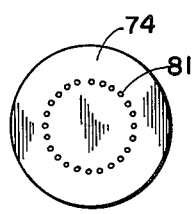
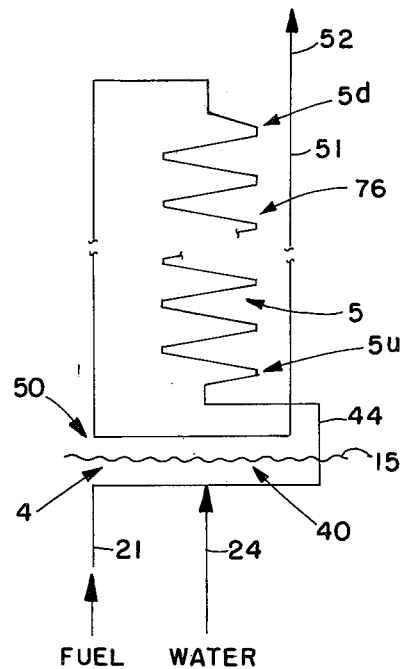

FLUID MIXER

CROSS-REFERENCE TO RELATED APPLICATION

This application is a continuation-in-part of copending U.S. application Ser. No. 897,670, for "Fluid Mixing Apparatus", filed Apr. 19, 1978, now U.S. Pat. No. 4,259,021 which application is commonly assigned with the present application. The disclosure of such application is hereby incorporated by reference.

TECHNICAL FIELD

The present invention relates to fluid mixing apparatus and, more particularly, to motionless mixers. Moreover, the present invention also includes features relating to orifice technology and mixing control valve technology.

BACKGROUND OF PRIOR ART

Frequently the best mixture of two media, such as fluids and, particularly such as normally non-readily mixable fluids, such as water and gasoline or other fuel, is effected by creating substantial turbulence during the mixing process. However, to create such turbulence it often is necessary to input a substantial amount of mechanical energy to the mixing apparatus itself. Another type of conventional mixer is the motionless mixer in which typically input fluids are divided into multiple streams and the multiple streams are recombined and redivided; ultimately, of course, the streams are combined for delivery to an outlet. Frequently in the latter type of mixer the thoroughness, homogeneity, or longevity (say of an emulsion) of the mixture produced is a function of the number of streams into which the flowing fluid is split and the number of times such splitting may occur and also may be a function, in certain mixers, of the amount of turbulence actually created during the mixing process. However, the larger the number of streams into which the fluid is split or divided and the larger number of times that may occur, so will the pressure of the fluid at the outlet be reduced, and the possible turbulence imparted will require energy input again, for example in the form of effort required to pump the fluid through the mixer. Moreover, the absolute difficulty in obtaining a thorough mixture of plural fluids when the flow rate thereof is relatively small is a significant problem encountered in the past.

The use of an orifice as a fluid flow controlling and as a fluid pressure dropping mechanism is well known. A disadvantage with using an orifice to reduce fluid pressure is that the pressure drop is nonlinearly proportional to flow rate through the orifice. Also, in the past, an orifice typically was connected to a fluid line using a union type connection in which longitudinal forces clamped the orifice in place hopefully providing fluid-tight security. However, such unions are expensive, require a fair amount of labor for installation, and often do not provide the desired fluid-tight integrity of connection.

SUMMARY OF INVENTION

In accordance with one aspect of the present invention a fluid mixer is provided to obtain a good mixture of plural fluids. Such fluid mixer includes a porous means for dispersing fluid flowing therethrough, inlet means positioned at least proximate one side of the porous means for limiting the area of the porous means at which fluid may enter the same, outlet means positioned at least proximate said porous means for limiting the area of the latter at which fluid may leave the same, and holding means for holding the porous means, inlet means and outlet means is operative flow through relation.

In accordance with another aspect of the invention, a control valve is provided. Such control valve may be used, for example, to control the delivery of one fluid intended to be added or injected into another fluid, with such control valve being operatively responsive to the differential pressure of the input fluid or fluids and the output fluid. Such valve, which controls the delivery of at least one fluid into another, includes a first fluid chamber, a first delivery means for delivering one fluid into said first fluid chamber, second delivery means for delivering another fluid into said first fluid chamber, a further fluid chamber in fluid flow relation with the first fluid chamber and through which fluid from the latter ordinarily must pass to exit the valve, and differential pressure responsive control means responsive to the fluid pressures in the first and further fluid chambers for controlling flow of the first fluid into the first fluid chamber.

In accordance with an additional aspect of the invention, a fluid orifice assembly includes an orifice means for controlling fluid flow therethrough, including a relatively rigid orifice housing and a fluid orifice therein and through which fluid may flow, and resilient means for holding said orifice means in position to receive fluid flow and to discharger fluid flow, said resilient means including means for applying a radially directed force to said orifice housing to hold the same in such position and to provide a substantially fluid-tight seal to prevent fluid leakage around said orifice means.

With the foregoing in mind, a primary object of the invention is to provide a fluid mixer improved in the noted respects.

Another object is to mix fluids efficiently, especially with minimum energy input to effect mixing.

An additional object is to form a long-lasting mixture of fluids, especially a long-lasting emulsion of not readily mixable fluids, such as water and gasoline or other fuel.

A further object is to provide a flow resistor for resisting fluid flow without or with minimum restricting of the flow.

Still another object is to provide an improved mixing control valve, and especially one responsive to differential fluid pressure and able to control flow of one of plural fluids without affecting another of such fluids.

Still an additional object is to provide an improved orifice assembly.

Still a further object is to facilitate and/or changing an orifice.

Even another object is to facilitate orifice flow control techniques.

These and other objects and advantages of the present invention will become more apparent as the following description proceeds.

To the accomplishment of the foregoing and related ends the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a front elevation view of a fluid mixer apparatus in accordance with the present invention;

FIG. 2 is a top view of the fluid mixer apparatus looking generally in the direction of the arrows 2—2 of FIG. 1;

FIG. 3 is a bottom view of the fluid mixer apparatus looking generally in the direction of the arrows 3—3 of FIG. 1;

FIG. 4 is a front elevation view, partly broken away in section, of the fluid mixer apparatus;

FIGS. 5, 6 and 7, respectively, are section views of the fluid mixer apparatus looking generally in the direction of the arrows 5—5, 6—6, and 7—7 of FIG. 4;

FIG. 8 is a plan view of a rigid disc with a radially central area limiting opening for an inlet or outlet member of a fluid mixer element used in the fluid mixer apparatus;

FIG. 9 is a plan view of a porous mixer medium and sealing ring used in a fluid mixer elements;

FIG. 10 is a plan view of a rigid disc with a radially spaced area limiting opening for an inlet or outlet member of a fluid mixer element used in the fluid mixer apparatus; and FIG. 11 is a schematic flow diagram depicting operation of the fluid mixer apparatus.

DESCRIPTION OF THE PREFERRED EMBODIMENT

Referring now in detail to the drawings, wherein like reference numerals designate like parts in the several figures, and initially to FIGS. 1-3, a fluid mixer apparatus in accordance with the present invention is generally indicated at 1. The fundamental components of the apparatus 1 include a housing 2, a fluid inlet assembly 3, a control valve 4 (FIG. 4), a plurality of fluid mixer elements 5 (FIG. 4), and a fluid outlet assembly 6. In the description below, the fluid mixer apparatus 1 will be presented as a device for mixing two relatively incompressible and not readily mixable fluids, namely fuel and water. The purpose of obtaining an effective long-lasting mixture or emulsion of fuel and water is to be able to provide such mixture as an input to a combustion engine enabling operation of the latter with a minimum of actual fuel input thereto. For use in mixing fuel and water the apparatus 1 preferably should be operatively positioned in the vertical orientation depicted in FIGS. 1, 4 and 11 to minimize the effect caused by a separating of the fluids during an interval that there is very little or no fluid flow. However, it will be appreciated that the apparatus 1 may be utilized in other positional orientations and may be employed to mix compressible fluids, incompressible fluids or both other than fuel and/or water.

The housing 2 includes an inlet cover 10, an intermediate member 11, a central housing portion 12, and an outlet cover 13, all of which preferably are formed of relatively rigid, strong material, such as metal, plastic, or other material that preferably will not be affected by the fluids flowing therethrough and environment in which the housing 2 is contained. A gasket 14 forms a fluid-tight seal between the inlet cover 10 and intermediate member 11, and such gasket 14 also includes an integral portion serving as the valve diaphragm 15 (FIG. 4) of the control valve 4. Further gaskets 16, 17 provide fluid-tight seals between the central housing portion 12 and, respectively, the intermediate member 11 and outlet cover 13. The gaskets 14, 16, 17 may be of Neoprene material or other material satisfactory for the sealing purpose mentioned, for the diaphragm function mentioned (with respect to the gasket 14), and for resistance to being affected by the fluids and/or environment. The various parts of the housing 2 preferably have surface portions facing one another that are flat or otherwise interrelated so as to assure the fluid-tight integrity of the housing 2. A plurality of screws 18 secure the inlet cover 10, intermediate member 11 and central housing portion 12, and a further plurality of screws 19 secure the outlet cover 13 and the central housing portion 12. Within the housing 2 is a plurality of fluid flow passages and chambers, all of which will be described in greater detail below. Moreover, within the central housing portion 12 is a substantially cylindrical chamber 20 (FIG. 4) axially positioned for the purpose of containing and holding a plurality of the fluid mixer elements 5 usually in compression in response to the compressive force exerted by the sides of the chamber 20 and by the intermediate member 11 and outlet cover 13.

At the fluid inlet assembly 3 is a fuel inlet fitting 21 of conventional form having a hollow interior flow passage to direct fuel into the apparatus 1, a smooth cylindrical outer surface 22, and an enlarged flange 23 over which a fuel line may be resiliently deformed with a pipe clamp (not shown) clamping the fuel line securely about the cylindrical outer surface 22 in fluid-tight relation.

Also at the fluid inlet assembly 3 is a water inlet fitting 24, which, too, has an interior passage 25 to deliver fluid into the apparatus 1, an outer cylindrical surface 26, and an enlarged flange 27. As in the case of the fuel inlet fitting 21, a resilient water inlet hose 28 may be resiliently deformed and slipped over the flange 27 to engage the cylindrical outer surface 26, and a pipe clamp 29 may be secured about the hose to couple the same in fluid-tight engagement with the fitting 24. By using the pipe clamp 29 and the resilient connection between the hose 28 and flange 27, which also provides a fluid-tight seal ordinarily preventing fluid leakage past the flange between the hose 28 and surface 26, a secure redundancy of fluid-tight connections is provided both at the water inlet and similarly at the fuel inlet.

A means for controlling particularly the quantity of water, as well, possibly, as the pressure thereof, delivered to the apparatus 1 is an orifice assembly 30. The orifice assembly 30 includes an orifice insert or housing 31 of relatively rigid material, such as metal, plastic or the like, having an accurately sized orifice passage 32 therein, an outer cylindrical wall 33 of a size to fit comfortably within the interior passage 25 of the water inlet fitting 24, and an enlarged flange 34 to limit travel of the orifice housing into the fitting 24 and to cooperate with the resilient water inlet hose 28, which also may be considered a part of the orifice assembly, to form a fluid-tight seal therewith. In particular, the hose 28 applies a radial force, i.e. a force directed radially against the flange 34 inwardly toward the axial center of the orifice housing 31, to effect the noted sealing function. Moreover, such radially applied force as well as the resilient contouring of the hose 28 about one or both surfaces of the flange 34 effects a proper mechanical positioning function of the orifice housing vis-a-vis the water inlet fitting 24.

In some instances it may be desired to change the orifice insert 31 to one having a different size orifice passage 32 for greater or lesser flow of water into the apparatus 1. Such change can be effected with facility simply by loosening the clamp 29, withdrawing the water inlet hose 28 from the water inlet fitting 24 and urging the orifice insert 31 out of the hose 28. Then, a new insert may be placed in the water inlet fitting 24 and the hose 28 reconnected as before.

Using the orifice assembly 30 of the invention, the manufacturing tolerances particularly on the outside surfaces of the orifice insert 31 may be larger than those required for prior orifice arrangements in which the insert was secured in place by a union type of coupling, thus facilitating manufacturing and reducing cost. Furthermore, it is significant to note that the good fluid-tight seal between the orifice flange 34 and the water inlet hose 28 assures minimal and preferably no leakage around the orifice, which leakage could be extremely detrimental especially in those instances that very small orifice passages 32 and/or relatively low fluid pressures are encountered. It will be appreciated that although the redundant type fluid seal using the resilient cooperation of the inlet hose 28 with respective flanges 27, 34 and the pipe clamp 29 circumferentially about the inlet hose 28 is preferred, other arrangements for connecting the inlet hose 28 to the water inlet fitting 24 may be employed, such as, for example, a pine tree type connection therebetween.

Turning now particularly to FIGS. 4–7 and 11, a fluid inlet mixing chamber 40 is formed in the inlet cover 10. Fuel from the fuel inlet fitting 21 enters the inlet mixing chamber 40, usually without restriction, via a fuel inlet passage 41 in the inlet cover 10. Water controllably enters the mixing chamber 40 from the water inlet fitting 24 via a water inlet passage 42 near the outlet of which is a valve seat 43 of the differential pressure responsive mixing control valve 4. With the control valve 4 open and fluid leaving the fluid outlet assembly 6, a mixture of the fluids, usually not a very thorough mixture, though, in the inlet mixing chamber 40 passes via a feed passage 44 out of the inlet cover 10, through a hole 45 in the gasket 14, through vertical and horizontal displaced extents in the intermediate member 11, through a hole 46 in the gasket 16 into the cylindrical chamber 20 of the central housing portion 12 for thorough mixing by the preferably plurality of fluid mixer elements 5 therein. The thoroughly mixed fluid leaves the cylindrical chamber 20 via a hole 47 in the gasket 17 into a feed-back passage 48, which laterally transfers the fluid across the outlet cover 13, conducts the fluid downward through a hole (not shown) in the gasket 17, through the central housing portion 12, through a hole 55 (not shown) in the gasket 16, and downward and laterally across part of the intermediate member 11 into a feed-back chamber 50, which is located on the opposite side of the valve diaphragm 15 from the inlet mixing chamber 40. Finally, fluid from the feed-back chamber 50 leaves the same by lateral and vertically upward flow through a mixture outlet passage 51 through the intermediate member 11, through a hole (not shown) in the gasket 16, through the central housing portion 12, through a hole (not shown) in the gasket 17, and ultimately through the outlet cover 13 for exiting the fluid mixer apparatus 1 via a mixture outlet fitting 52 of the fluid outlet assembly 6. Although not illustrated completely in the drawings, it will be appreciated that the portion of the feed-back passage 48 which flows through the central housing portion 12 is a straight through passage or hole through the latter aligned with the end 48a of the feed-back passage 48 in the outlet cover 13, as is shown most clearly in FIG. 2. Similarly, that portion of the mixture outlet passage 51 is a vertical passage or opening through a wall of the central housing portion 12 in vertical alignment with the mixture outlet fitting 52, as is seen most clearly in FIG. 2.

With the foregoing discussion of the flow path through the fluid mixer apparatus 1 in mind, a detailed description of the differential pressure responsive mixing control valve 4 and the fluid mixer elements 5 will now be presented.

In the control valve 4 the valve diaphragm portion 15, which is part of the gasket 14, is sealed peripherally between respective support surfaces 60, 61 of the inlet cover 10 and intermediate member 11 with the central portion or area of the diaphragm 15 being relatively flexible and in the most preferred form resilient ordinarily to assume a linear or flat condition illustrated, for example, in FIG. 4. The diaphragm 15 is exposed to the fluid pressure in the inlet mixing chamber 40 and to the fluid pressure in the feed-back chamber 50 and will tend to flex in one direction or the other in response to the differential pressure across the diaphragm. A bias spring 62 guided in position in a small recess 63 within the intermediate member 11 and by a ring, raised nub, or the like, not shown, integral with or attached to the upper surface of the diaphragm 15 applies a bias force to the latter in order to close the control valve 4 when the differential pressure across the diaphragm is zero or, if desired, smaller than a predetermined magnitude in the direction tending to close the valve. Such zero differential pressure would occur, for example, when the fluid path from the fluid outlet assembly 6 is blocked, say by a further control valve downstream thereof, causing stoppage of fluid flow through the fluid mixer apparatus 1. At that time it would be desirable to prevent the possibility of injection of excess water into the inlet mixing chamber 40 or even the causing of a backflow down through the fuel inlet assembly 3 if, for example, the water were being pumped for delivery into the mixing chamber 40 at a pressure greater than that at which the fuel is delivered thereto.

Integral with the valve diaphragm 15 is a valve closure member 64, which has a surface capable of mating with the valve seat 43 in a manner capable of stopping flow of water into the inlet mixing chamber 40. In the preferred form of the invention, the valve closure member 64 is tapered generally in the manner illustrated to truncated conical form in order to fit into the female valve seat 43. In the preferred embodiment and best mode of the invention, the valve closure member 64 and valve seat 43 cooperate in a manner primarily simply to permit water injection or to stop water injection. However, if desired, the configuration of the valve closure member and/or the valve seat 43 may be altered in a manner to permit relatively accurate control of the amount of water injected into the inlet mixing chamber 40, of course in response to the differential pressure across the diaphragm 15.

As will be described further below, a pressure drop will occur in the fluid flowing through the fluid mixer elements 5 in the cylindrical chamber 20. Such fluid mixer elements are intended to be flow resisters, i.e. they provide a resistance to flow but do not actually restrict fluid flow. Therefore, a pressure drop occurs in the fluid flowing through the fluid mixer elements of a magnitude that is approximately directly proportional to the flow rate. Accordingly, for large flow rates, there will be a larger pressure differential across the valve diaphragm 15 tending to open the same a near maximum amount; whereas for relatively small flow rates, the differential pressure will be relatively small and the amount of flexure of the valve diaphragm 15 and degree of opening occurring between the valve seat 43 and valve closure member 64 will correspondingly be relatively small. Furthermore, it has been discovered that a combustion engine operating at a relatively high rate, frequency, r.p.m., etc., at which relatively high fuel flow is provided thereto can tolerate a higher concentration of water in the fuel-water mixture and still operate smoothly and efficiently; conversely at low speed operation wherein the fuel flow rate is lower, less water in the fuel-water mixture can be tolerated to obtain smooth efficient engine operation. Thus, in the event that the differential pressure responsive mixing control valve 4 is made in a manner to provide a variable rate of water injection as well as on-off water flow control, which, as was mentioned above, is a feature of the invention, the fluid mixer apparatus will automatically accommodate such multiple control function in dependence on selection of the various dimensional parameters that can be experimentally derived and readily adjusted for the various parts of the apparatus 1.

In view of the foregoing, it will be appreciated that the differential pressure responsive mixing control valve is a flow controller valve operational as an hydraulic equivalent of an electrical circuit since there is a fixed resistance causing a pressure drop on one side of the valve relative to the back pressure on the other side of the valve which enables the valve to pass the water when there is fluid output from the fluid outlet assembly 6. Importantly, the control valve 4 will shut off only water flow but not the primary liquid, namely the fuel flow. There is a cooperative interrelationship between the flow resister and the outlet and inlet flows and pressures which enables the valve 4 to be responsive both the inlet and to the outlet pressure. Depending on the shape of the valve seat 43 and/or the valve closure member 64, the control valve 4 may also operate as a metering valve. Furthermore, with the control valve 4 so designed to provide the metering function, it also may be possible to obtain satisfactory water flow control while simultaneously eliminating the orifice insert 31 from the water flow path to the valve 4. If desired, the required pressure drop of the fluid between the inlet mixing chamber 40 and the feed-back chamber 50 may be effected using a further orifice or even other means. However, when using an orifice substantial non-linearities are encountered in the relationship between flow rate and pressure drop, as is well known; whereas in the preferred embodiment and best mode of the invention utilizing the proportional flow resister afforded by the fluid mixer elements 5, the pressure differential across the diaphragm 15 will more linearly follow the flow rate variations.

It will also be appreciated that when using the fluid mixer apparatus 1 to mix fuel and water, it may be desirable to supply one of those ingredients to the inlet mixing chamber 40 at a pressure slightly greater than the other ingredient; in fact, typically the water would be provided at from about 3 to 5 psi pressure greater than that at which the fuel is provided—this assures that fuel will not flow back into the water line. On the other hand, when there is no outflow from the apparatus 1, it is essential that water not be forced back into the fuel line. Accordingly, the differential pressure responsive control valve as biased by the spring 62 or by other means, if desired, assures stopping of water flow when outflow from the fluid outlet assembly 6, and, thus, the inflow of fuel through the fuel inlet assembly 3, may be stopped.

Referring now to the fluid mixer elements 5, as are seen most clearly in FIGS. 4, and 8–10, each includes a porous fluid dispersing medium 70, an inlet and an outlet, all of which are held in operative flow through relation. The porous medium 70 in the preferred embodiment and best mode of the invention is a form of open cell urethane foam having a random distribution of voids which allow fluid to flow therethrough in multiple random flow paths. Alternatively, the porous medium or material may be other than foam, such as, for example, steel wool, aluminum wool, etc., and even may be particulate matter if packed in a satisfactory condition to permit and to cause flow through in multiple random flow paths. In the most preferred embodiment, the foam material is an open cell polyester, which can be purchased, for example, in varying densities—a density of one-half pound per cubic foot has been found satisfactory when used in the fluid mixer apparatus 1 in compression within the cylindrical chamber 20 to a density of 1.75 pounds per cubic foot. It will be appreciated that material that is too dense will produce too large a resistance to flow therethrough; whereas material that is not adequately dense or too porous will result in poor mixing quality.

It is the purpose of the inlet and outlet of each fluid mixer to limit the area from which fluid may enter or leave the porous medium of each fluid mixer element 5. Moreover, it is preferred that each fluid mixer element 5 operate individually and jointly as a fluid flow resister or resistance, namely a device that causes a drop in pressure of fluid flowing therethrough without restricting the fluid flow itself. To accomplish such truly resister function, or nearly so, the total cross sectional area approximately perpendicular to the flow direction of fluid entering a porous medium through the limited area of an inlet, the total cross sectional area approximately perpendicular to the direction of fluid flow where fluid leaves a porous medium at the limited area of an outlet thereof, and the total incremental cross sectional area or integral of the cross sectional area perpendicular to a net fluid flow front at any location in the porous medium between the fluid inlet and the fluid outlet thereof, each should be at least approximately the same. Each such cross sectional area, then, will be referred to hereinafter as a standardized cross sectional area. Furthermore, to avoid impeding fluid flow through the plurality of fluid mixer elements 5, it is preferred that such standardized cross sectional area be at least approximately equal to the internal open cross sectional area of the fuel inlet fitting 21, with the cross sectional areas of the various flow passages in the housing 2 of the fluid mixer apparatus 1 also being approximately equal to such standardized cross sectional area.

As fluid enters one of the porous media of a fluid mixer element 5, such fluid will be divided into multiple flow streams with each preferably undergoing a number of directional changes before leaving the porous medium. It is such multiple directional changes, then, that effect the drop in fluid pressure.

As is seen in FIG. 4, plural fluid mixer elements 5 are stacked, compressed and located in the cylindrical chamber 20 of the central housing portion 12. To avoid channeling, there is an inlet member and an outlet member for the respective porous media at the opposite ends of the stack thereof. Those inlet and outlet members at the extremities of the stack are used, of course, only with the directly adjacent respective porous medium. However, for the other inlet and outlet members located in the stack between respectively adjacent porous media, the outlet member of one fluid mixer element 5 in fact forms the inlet member of the next downstream fluid mixer element.

Looking at the fluid mixer element 5u, i.e. the one most upstream vis-a-vis the fluid flow through the fluid mixer apparatus 1, the inlet member thereof is a sheet or other formation of material that is impervious to the flow of fluid therethrough. Such sheet may be in the form of a foil or foil-like material, more rigid material of plastic, metal or the like, and in the preferred embodiment and best mode is a relatively thin disc of relatively rigid, hard brass designated 71. Each of the other inlet and outlet members of the fluid mixer elements 5, then, also preferably is a hard brass disc having a circular peripheral circumference to fit in the cylindrical chamber 20 normally relatively closely to the wall of the latter without necessarily directly contacting the same. In accordance with the preferred embodiment and best mode the porous material 70 also is of the above mentioned polyester form of urethane foam having open cell characteristics, satisfactory density characteristics, and generally taking on a disc-like form with opposite surfaces 72, 73 being engaged with respective fluid inlet and fluid outlet discs, such as the inlet disc 71 and the outlet disc 74 of the fluid mixer element 5u.

A sealing ring 75 of annular disc-like shape is positioned circumferentially about each porous disc 70 for multiple purposes. The sealing ring 75 preferably is formed of Neoprene or other material that has closed cell characteristics to prevent fluid flow therethrough and has adequate resilient compression characteristics. In particular, by locating the sealing ring 75 circumferentially about a porous disc 70 and in engagement with the circumferential surface of the latter, upon applying a compression force to both the sealing ring and the porous disc, say by the immediate inlet and outlet discs 71, 74 or by the compression effected within the cylindrical chamber 20 by the cooperating intermediate housing member 11 and outlet cover 13, the disc-like flat faces of the ring 75 provide a fluid-tight seal with the immediately adjacent respective inlet and outlet discs 71, 74, the inner cylindrical wall of the ring 75 forms a seal with the outer cylindrical wall of the porous disc 70, and the outer cylindrical wall of the ring 75 forms a fluid-tight seal with the interior cylindrical wall of the cylindrical chamber 20. Thus, the axial compression force effects a good radial sealing force as well as a direct contact force against the individual sealing rings 75 by the inlet and outlet discs 71, 74 to prevent fluid flowing through the stack 76 of fluid mixer elements 5 from leaking around or bypassing any individual fluid mixer element.

To help distribute fluid in the respective porous discs 70, the radial location of the opening or openings in an inlet disc for the same is different than the radial location of the openings through the outlet disc therefor. Such distribution of the openings at least in the alternate inlet and outlet discs helps to avoid channeling of fluid through a given porous fluid dispersing disc 70. Again, according to the preferred embodiment and best mode, the radial location of one such opening, such as the opening 80 in the first inlet disc 71, is centrally located therein preferably, as shown, directly in alignment with the hole 46 in the gasket 16. Moreover, the outlet disc 74 preferably has a plurality of openings 81, with those being distributed at distances relatively radially remote of the disc center and approximate central axis of the fluid mixer apparatus 1, and so on. Of course, it is preferred that the opening in the outlet disc 74 of the most remote fluid mixer element 5d downstream of the fluid flow path through the apparatus 1 be a single hole 82 aligned with the hole 47 through the gasket 17 for delivery of thoroughly mixed fluid into the feed-back passage 48.

It is possible that a porous medium 70 having optimum density, fluid dispersing, and fluid flow-through characteristics may after a time become affected to a relatively unusable condition and even to a fixed compressed form making the same difficult to remove from the cylindrical chamber 20, especially when such porous medium is exposed to gasoline. It has been found that the Neoprene material of the sealing ring 75, however, will not be so affected. Therefore, a further function of the sealing ring 75 is to undergo expansion at such time that the outlet cover 13 is removed to facilitate removal of all of the fluid mixer elements in the stack 76.

The fluid mixer apparatus 1 utilizing the plural fluid mixer elements 5 obtains the effect of high velocity, high turbulence, high energy input mixing of fluids flowing therethrough even though the actual flow rate therethrough is at a relatively low velocity and the amount of energy input required, say to pump the fluids through the mixer, also is relatively small.

The apparatus 1 is believed almost to eliminate totally laminar flow and instead gives an effect of extremely turbulent flow with high shear. Laminar flow streams are substantially divided and repositioned as fluid flows, say, from the limited area of the central opening 80 in the inlet disc 71 through the multiple pores in the porous disc 70 and ultimately out through the plurality of radially and circularly spaced openings 81 (which have a sum total cross sectional area equal to that of the standardized cross sectional area, including, particularly, that of the central opening 80). Moreover, the plural fluid streams entering the second porous disc 70 from the plural radial openings 81 in the outlet/inlet disc 74 pass through such porous disc and recombine, for example, at the hole 83 in the outlet disc therefor. A certain amount of the foam material of the respective porous discs does extend into the various openings of the latter; nevertheless, there still is a certain amount of dividing and recombining of streams a plurality of times with a substantial dispersion occurring in each fluid mixer element 5. In fact, it is believed that the extremely effective fluid mixing obtained by the fluid mixer apparatus 1 in accordance with the invention may be due at least in part to the breaking up of fluid particles and the rubbing of particles together thereby causing an electrostatic charge ultimately causing attraction between opposite polarity charged particles resulting in a very long lasting emulsion of the mixed fluid leaving the fluid outlet assembly 6.

It is noted that the fluid mixer elements 5 and the overall fluid mixer apparatus 1 can provide fluid filtering function. However, the elements 5 and apparatus 1 are significantly different from the prior art fine filters which characteristically encounter substantial channeling problems and, accordingly, require elaborate fluid distribution mechanics.

It is hypothesized that the long lasting emulsion of fuel and water obtained by the present invention is achieved, at least in part, due to the multiple dividing, recombining, and effective stratifying of fluid flowing through the fluid mixer apparatus 1. Then, according to the known formula presented in the above mentioned copending application, theoretically the size of the individual fluid particles ultimately leaving the last downstream fluid mixer element 5d would be smaller than the molecular size of the smallest ingredient, namely the water. By adopting parameters for the sizes, densities, thicknesses, etc. of the various parts of the fluid mixer apparatus 1, the aforesaid formula may be used to calculate that nine fluid mixer elements in the stack 76 would obtain the desired result vis-a-vis the theoretically smallest particle size being smaller than that of the smallest molecular size ingredient.

Moreover, in practice, it has been found that using nine fluid mixer elements 5 in accordance with the invention described above, the longevity of the emulsion obtained and the thoroughness of mixing is optimum; with more than nine fluid mixer elements, the pressure drop becomes excessive without appreciable gain in fluid mixing characteristics, thus wasting energy; and with fewer than nine fluid mixer elements, the longevity of the emulsion and the thoroughness of the mixing has been inconsistent.

One additional advantage discovered inuring to the invention is the ability of the fluid mixer apparatus 1 to act as an hydraulic accumulator smoothing out perturbations in the fluid flowing therethrough by the resilient characteristic of the porous foam discs 70.

STATEMENT OF INDUSTRIAL APPLICATION

In view of the foregoing, it will be appreciated that the fluid mixer apparatus 1 in accordance with the present invention may be used to control the quantity of one fluid injected into another, to control the injecting of one fluid into another, to mix the fluids, and to provide a long lasting mixture at the output of the apparatus. Summarizing operation, then, with reference to FIG. 11 in particular, fuel and water enter through the respective fuel and water inlet fittings 21, 24 into the inlet mixing chamber 40 when the differential pressure across the diaphragm 15 has caused the differential pressure responsive mixing control valve to open. The preliminarily mixed fluids from the inlet mixing chamber 40 pass through the feed passage 44 into the stack 76 of fluid mixer elements 5. The thoroughly mixed fluid leaving the stack 76 flows through feed-back passage 48 into the feed-back chamber 50 to provide pressure feed-back on the diaphragm 15, and then continues via the mixture outlet passage 51 to the mixture outlet fitting 52 of the fluid outlet assembly 6 for subsequent downstream usage.

I claim:

1. A valve for controlling the delivery of one fluid into another, comprising a first fluid chamber; first delivery means for delivering one fluid into said first fluid chamber; second delivery means for delivering another fluid into said first fluid chamber; a further fluid chamber in fluid flow relation with said first fluid chamber and through which fluid from the latter ordinarily must pass to exit the valve; and differential pressure responsive control means responsive to the fluid pressures in said first and further fluid chambers for controlling flow of said first fluid into said first fluid chamber.

2. The valve of claim 1, said first delivery means comprising a valve seat and said control means comprising means for engaging said seat to stop the flow of said one fluid into said first chamber.

3. The valve of claim 2, said seat including an interior area and said control means comprising a flexible support and a tapered protrusion means for extending into said seat interior area to control the fluid flow.

4. The valve of claims 1 or 2, said control means comprising a deformable member having surfaces facing and forming part of said first and further fluid chambers.

5. The valve of claim 4, said deformable member comprising a resilient diaphragm-like member.

6. The valve of claim 5, further comprising first and second relatively rigid members, said first and further fluid chambers being formed at least in part by said respective first and second relatively rigid members, and means for securing said relatively rigid members and said diaphragm-like means in fluid tight engagement, whereby said relatively rigid members and said diaphragm-like member cooperate to prevent unintentional leaking of fluid from said respective fluid chambers.

7. The valve of claim 4, further comprising biasing means for normally urging said control means toward a position to have predetermined affect on such first fluid flow.

8. The valve of claim 7, said biasing means comprising a spring for urging said control means to stop flow of said one fluid into said first fluid chamber.

9. The valve of claim 8, said control means comprising a flow stopping means having a limited surface exposure to such one fluid when closed for stopping flow of such one fluid, and said spring comprising one for applying adequate force to said control means to maintain stopped such flow of such one fluid without adequate net differential pressure acting on said control means in the presence of normally expected pressures of such one fluid from said first delivery means.

10. The valve of claim 1, said control means comprising a metering valve for metering the amount of one fluid injected into another, and further comprising a flow resistor means for producing a pressure drop in the fluid flowing therethrough in substantially direct proportion to the rate of flow of fluid therethrough, thereby to vary the differential pressure across said control means and, accordingly, the amount of such one fluid injected into another fluid.

11. The valve of claim 1, further comprising coupling means for fluidically coupling said first and further fluid chambers.

12. The valve of claim 11, said coupling means comprising means for changing the pressure of fluid flowing therethrough to cause a differential pressure across said control means.

13. The valve of claim 12, said first fluid chamber comprising a mixing chamber for mixing the fluids therein and said coupling means comprising mixing means for further mixing the fluid leaving said mixing chamber prior to its arrival at said further fluid chamber.

14. The valve of claim 12, said means for mixing comprising a flow resistor.

15. The valve of claim 14, said flow resistor comprising means for increasing the pressure drop of fluid flow therethrough in substantially direct proportion to the flow rate.

16. The valve of claim 12, said control means comprising means for shutting off the flow of such one fluid while permitting continued flow at least into said first fluid chamber of such another fluid.

17. The valve of claim 12, further comprising fluid outlet means for passing fluid out from said further fluid chamber, and said control means comprising means for shutting off the flow of such one fluid when the flow of fluid from said fluid outlet means is blocked.

18. The valve of claim 17, said control means comprising a resilient means for assuring shutting off such flow of such one fluid when the magnitude of such differential pressure is at least approximately zero.

19. The valve of claim 12, said means for changing comprising means for increasing the pressure drop of fluid flowing therethrough in substantially direct proportion to the flow rate.

20. A fluid mixer, comprising porous means for passing a fluid therethrough while dispersing such flowing fluid; inlet means positioned at least proximate one side of porous means for defining a prescribed area of said porous means at which fluid may enter the same; outlet means positioned at least proximate said porous means for defining a prescribed area of the latter at which fluid may leave the same; each of said inlet means and outlet means comprising a material substantially less pervious to such fluid than said porous means and means of limited area in such material limiting such respective areas for fluid to enter and to leave said porous material; and holding means for holding said porous means, inlet means and outlet means in operative flow through relation.

21. The mixer of claim 20, said porous means being disc-shaped and having opposite surfaces, said inlet and outlet means being engaged with respective opposite surfaces of said disc-shape porous means.

22. The mixer of claim 21, said inlet and outlet means being formed of material substantially impervious to fluid flow therethrough, said means of limited area of said inlet means comprising opening means for passing fluid into said porous means at a first radial location relative to a principal generally axial direction of flow through the latter and said means of limited area of said outlet means comprising opening means for passing fluid out from said porous means at a second raidl location of the latter different from that of said first radial location.

23. The mixer of claim 22, said porous means comprising a plurality of the same in fluid flow relation separated from each other by at least one inlet means or outlet means, and wherein the outlet means directly associated with a relatively upstream porous member comprises the inlet means for the immediately adjacent downstream porous member.

24. The mixer of claim 22, said holding means comprising a hollow container, and further comprising resilient sealing ring-like means of non-porous material for preventing fluid flow between respective porous means and walls of said container.

25. The mixer of claim 22, said opening means of one of said inlet and outlet means comprising a single opening approximately at the center of one surface of said disc-like porous means and said opening means of the other of said inlet and outlet means comprising a plurality of openings radially spaced away from the approximate center of the other surface of said disc-like porous means.

26. The mixer of claim 25, said plurality of openings being approximately equally spaced from each other in a generally circular array.

27. The mixer of claims 22, 25, or 26, wherein the total cross-sectional area of said opening means of said inlet means is at least approximately equal to the total cross-sectional area of said opening means of said outlet means.

28. The mixer of claim 27, wherein said porous means has a total cross-sectional area open to fluid flow therethrough, as experienced by a fluid front of the fluid flowing therethrough at least approximately equal to the total cross-sectional area of said opening means of said inlet means or outlet means.

29. The mixer of claim 28, said porous means comprising foam-like material.

30. The mixer of claim 29, said inlet means and said outlet means comprising relatively rigid discs of thinner axial extent through said respective opening means thereof than the thickness of said porous means therebetween.

31. The mixer of claim 30, said holding means comprising means for compressing said foam-like material.

32. The mixer of claim 31, further comprising a plurality of said porous means, with each being separated from the next adjacent one by at least one inlet means or outlet means and wherein an outlet means of a relatively upstream porous means forms an inlet means for the next adjacent relatively downstream porous means.

33. The mixer of claims 20 or 21, said porous means comprising foam-like material.

34. The mixer of claim 33, said inlet means and said outlet means comprising relatively rigid discs of thinner axial extent in a generally axial principal direction of fluid flow through said respective means for defining thereof than the axial thickness of said porous means therebetween.

35. The mixer of claim 20, said holding comprising a relatively rigid housing having an interior chamber for containing said porous means, inlet means, and outlet means.

36. The mixer of claim 35, said housing comprising an inlet mixing chamber for receiving such fluids and preliminarily mixing the same, feed passage means for feeding such preliminarily mixed fluids to a stack of fluid mixer elements, each being comprised of at least one porous means, inlet means, and outlet means.

37. The mixer of claims 20, 35, or 36, further comprising a valve for controlling the delivery of one of such fluids into another of such fluids, including a first fluid chamber; first delivery means for delivering one fluid into said first fluid chamber; second delivery means for delivering another fluid into said first fluid chamber; a further fluid chamber in fluid flow relation with said first fluid chamber and through which fluid from the latter ordinarily must pass to exit the valve; and differential pressure responsive control means responsive to the fluid pressures in said first and further fluid chambers for controlling the flow of said first fluid into said first fluid chamber.

38. The mixer of claim 37, wherein said first delivery means comprises means for delivering water and said second delivery means comprises means for delivering fuel.

39. The mixer of claim 38, further comprising a fluid orifice assembly for controlling the delivery of water, including orifice means controlling fluid flow therethrough, including a relatively rigid orifice housing and a fluid orifice therein, and through which fluid may flow; and resilient means for holding said orifice means in position to receive fluid flow and to discharge fluid flow, said resilient means including means for applying a radially directed force to said orifice housing to hold the same in such position, and to provide a substantially fluid tight seal to prevent fluid leakage around said orifice means.

* * * * *